(12) United States Patent
Rong

(10) Patent No.: US 10,133,786 B2
(45) Date of Patent: Nov. 20, 2018

(54) METHOD AND SYSTEM FOR RECOMMENDING TARGET OBJECT INFORMATION

(71) Applicant: Alibaba Group Holding Limited, George Town (KY)

(72) Inventor: Jia Rong, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 15/210,564

(22) Filed: Jul. 14, 2016

(65) Prior Publication Data

US 2016/0321326 A1  Nov. 3, 2016
US 2018/0196853 A9  Jul. 12, 2018

Related U.S. Application Data

(63) Continuation of application No. 15/067,748, filed on Mar. 11, 2016, now Pat. No. 9,418,123, which is a (Continued)

(30) Foreign Application Priority Data

Nov. 20, 2012  (CN) .......................... 2012 1 0470206

(51) Int. Cl.
*G06F 17/00* (2006.01)
*G06F 17/30* (2006.01)

(52) U.S. Cl.
CPC .. *G06F 17/30528* (2013.01); *G06F 17/30477* (2013.01); *G06F 17/30554* (2013.01); *G06F 17/30867* (2013.01)

(58) Field of Classification Search
CPC ............... G06Q 30/02; G06Q 30/0631; G06Q 30/0202; G06Q 10/10; G06Q 30/0254; G06Q 30/0282
See application file for complete search history.

(56) References Cited

U.S. PATENT DOCUMENTS 7,401,072 B2   7/2008  Piscitello
7,792,813 B2   9/2010  Selberg
(Continued)

FOREIGN PATENT DOCUMENTS

CN   101226555   7/2008
CN   102663626   10/2015
(Continued)

*Primary Examiner* — Truong V Vo
(74) *Attorney, Agent, or Firm* — Van Pelt, Yi & James LLP

(57) ABSTRACT

Embodiments of the present application relate to a method for recommending target object information, a system for recommending target object information, a client for recommending target object information, a server for recommending target object information, and a computer program product for recommending target object information. A method for recommending target object information is provided. The method includes receiving a target object informational recommendation request including information pertaining to a plurality of short-listed objects selected, determining historical selection information on the plurality of short-listed objects, the historical selection information including a historical count, a selection count, or both, and sending the part or all of the short-listed object historical selection information to a client.

23 Claims, 12 Drawing Sheets

Related U.S. Application Data continuation of application No. 14/073,740, filed on Nov. 6, 2013, now Pat. No. 9,317,864.

(56) References Cited

U.S. PATENT DOCUMENTS

| | | | |
|---|---|---|---|
| 7,809,601 | B2 | 10/2010 | Shaya |
| 7,953,619 | B2 | 5/2011 | Heredia |
| 8,255,263 | B2 | 8/2012 | Smallwood |
| 8,296,198 | B2 | 10/2012 | Bhatt |
| 2005/0182773 | A1 | 8/2005 | Feinsmith |
| 2011/0196923 | A1 | 8/2011 | Marcucci |
| 2011/0313987 | A1* | 12/2011 | Ghosh ............... G06F 17/30675 707/706 |
| 2012/0143718 | A1 | 6/2012 | Graham |

FOREIGN PATENT DOCUMENTS

| | | |
|---|---|---|
| JP | 2003296542 | 10/2003 |
| JP | 2005084743 | 3/2005 |
| JP | 2007109058 | 4/2007 |

\* cited by examiner

650

900

METHOD AND SYSTEM FOR RECOMMENDING TARGET OBJECT INFORMATION

CROSS REFERENCE TO OTHER APPLICATIONS

This application is a continuation of co-pending U.S. patent application Ser. No. 15/067,748, entitled METHOD AND SYSTEM FOR RECOMMENDING TARGET OBJECT INFORMATION filed Mar. 11, 2016 which is incorporated herein by reference for all purposes, which continuation of U.S. patent application Ser. No. 14/073,740, now U.S. Pat. No. 9,317,864, entitled METHOD AND SYSTEM FOR RECOMMENDING TARGET OBJECT INFORMATION filed Nov. 6, 2013 which is incorporated herein by reference for all purposes, which claims priority to People's Republic of China Patent Application No. 201210470206.1 entitled TARGET OBJECT INFORMATION RECOMMENDING METHOD, SERVER, AND CLIENT, filed Nov. 20, 2012 which is incorporated herein by reference for all purposes.

FIELD OF THE INVENTION

The present invention relates to a method and system for recommending target object information.

BACKGROUND OF THE INVENTION

Internet applications have become popular for individuals and businesses alike. Currently, there are many types of Internet business services, which are primarily deployed on various Internet servers. For example, in popular transaction-type websites, network servers provide various kinds of transaction services to the public. The transaction services include physical entity transaction services, information transaction services, etc. Having user display descriptive information on business objects which a website is able to provide on a web page so that other users may make their selections is an example in which a business service is implemented on such a website. For example, if the business object is a physical entity, the descriptive information displayed on the web page includes images together with name, use, and price of the business object. In another example, when a business object is information, descriptive information displayed on the web page is a summary of the information or key phrases. After the descriptive information on the business objects, which a website is able to provide on a web page, is displayed by browsing the business objects displayed on the web page, other users are able to select the objects which they themselves use for conducting subsequent business services. For example, a request is sent to the server to obtain a business object. The website server acquires the object according to an established manner of processing. A plurality of such established manners of processing may exist. For example, the user requests login, or the user requests paying a certain fee for the object.

Presently, when a user selects a business object displayed on the web page, the user's selection is based mainly on the descriptive information on the selected business object. For example, the user views name, purpose, pictures, and other such information about the object displayed on the web page, and thereby determines whether the business object complies with the user's requirements. In actual applications, a large volume of business objects exists on the Internet. Typically, the descriptive information for each business object is a simple description of the business object. Often, it is very difficult for users to have a full understanding of the business object based on the descriptive information of the business object. For example, it is very difficult for a user who has not yet actually obtained a business object to determine whether the business object described on a web page will have operating defects, whether the pictures of the business object are authentic, whether the descriptive information is accurate, etc. Selecting the appropriate business object when false descriptive information has been added to the business object is particularly difficult for the user.

In some conventional Internet applications, a first user will, while browsing business objects, establish a connection with a second user who may understand the business objects browsed by the first user to give some advice to determine whether the business objects are worth buying. For example, the first user may ask the second user who is a friend of the first user what is the second user's opinion about the business objects (for example, the products) which the first user wants to buy.

Some of the limitations described above are: 1) The second user may not actually understand the business objects browsed by the first user. Therefore, confirmation information describing the business objects that are obtained from the second user may not be accurate. 2) Such a mode of communication lacks focus and can waste server and network resources. 3) Even if the first user knows that the second user understands the browsed business objects, the second user may not stay online. In this case, the first user cannot promptly establish a connection with the second user to obtain a response and is thus unable to acquire information confirming the business object. This is inefficient. 4) Even if the first user is able to establish a communication connection with the second user, the confirmation information acquired may be very limited. A very high likelihood exists that false descriptive information is provided by the business object provider, and the confirmation information cannot reflect the accuracy of the descriptive information corresponding to the business object.

BRIEF DESCRIPTION OF THE DRAWINGS

Various embodiments of the invention are disclosed in the following detailed description and the accompanying drawings.

In order to provide a clearer explanation of the technical solutions in the present application, simple introductions are given below to the drawings, which are needed to describe the embodiments or the prior art. Obviously, the drawings described below are merely some examples of the present invention. Persons with ordinary skill in the art could, without expending creative effort, obtain other drawings on the basis of these drawings

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application provides embodiments of a method and system for recommending target object information. The method and system can be applied to the process whereby users browse business objects on web pages. The method and system for recommending target object information provided by the present application can be applied to various kinds of Internet business websites.

Figure 1:
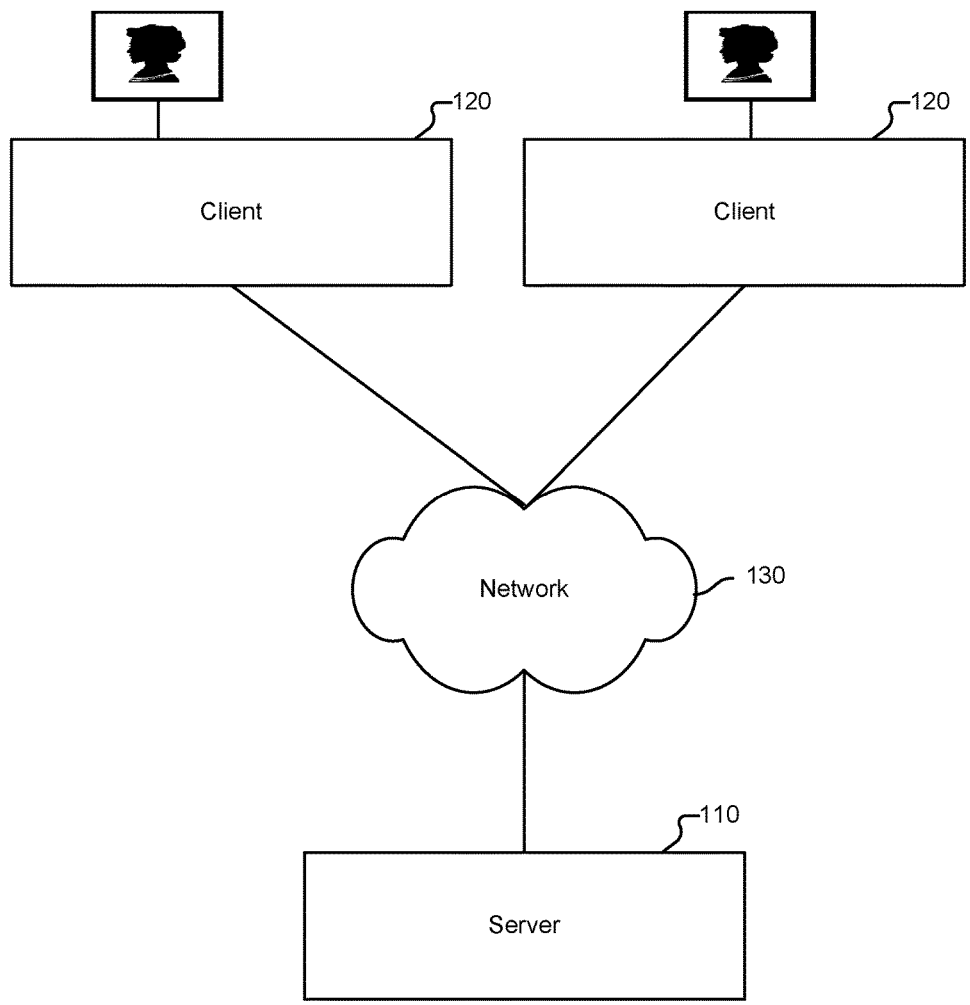
FIG. 1 is a structural diagram of an embodiment of a system for recommending target object information.

FIG. 1 is a structural diagram of an embodiment of a system for recommending target object information. In some embodiments, the system 100 includes a server 110 connected to a plurality of clients 120 via a network 130. The clients 120 include but are not limited to computers, smart phones, tablet computers, and other such hardware. Web pages and applications are presented by such hardware. An operator or operators of client 120 are one or more online users.

Figure 2:
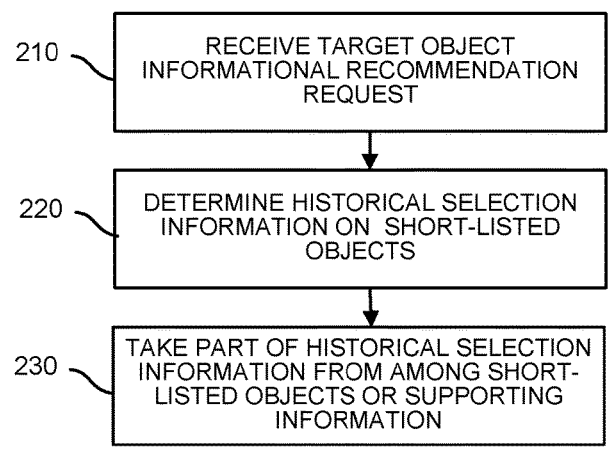
FIG. 2 is a flowchart of an embodiment of a method for recommending target object information.

FIG. 2 is a flowchart of an embodiment of a method for recommending target object information. In some embodiments, the method 200 is implemented by the server 110 of FIG. 1 and comprises:

In 210, the server receives a target object informational recommendation request. In some embodiments, the request includes information on a plurality of short-listed objects selected by a first user.

As an example, the first user visits a website through a client such as a browser, browses business objects displayed on corresponding web pages, and selects a business object to confirm as final target objects. For example, product objects displayed on the corresponding web pages of the website are business objects. Examples of the business objects include physical products, virtual products, value information, etc. The final target objects are confirmed by browsing the business objects on the corresponding web pages and by selecting the business objects.

Since numerous business objects exist and the information on the business objects displayed on the web pages is limited, in some embodiments, the first user finds selecting the final target objects while browsing the numerous business objects difficult due to the limited information on the business objects. Therefore, in some embodiment, the first user selects a plurality of business objects as short-listed objects (for example, objects placed in a shopping cart) based on the business objects displayed on the web pages.

After the first user has selected the plurality of short-listed objects on the client, and after the client generates a target object recommendation request, the client sends the target object informational recommendation request to the server that displays the business objects. In some embodiments, the target object informational recommendation request includes information on the short-listed objects selected by the first user. Examples of the information on the selected short-listed objects includes one or more of the categories to which the short-listed objects belong, names of the short-listed objects, item number, item ID, and other such information.

Figure 3:
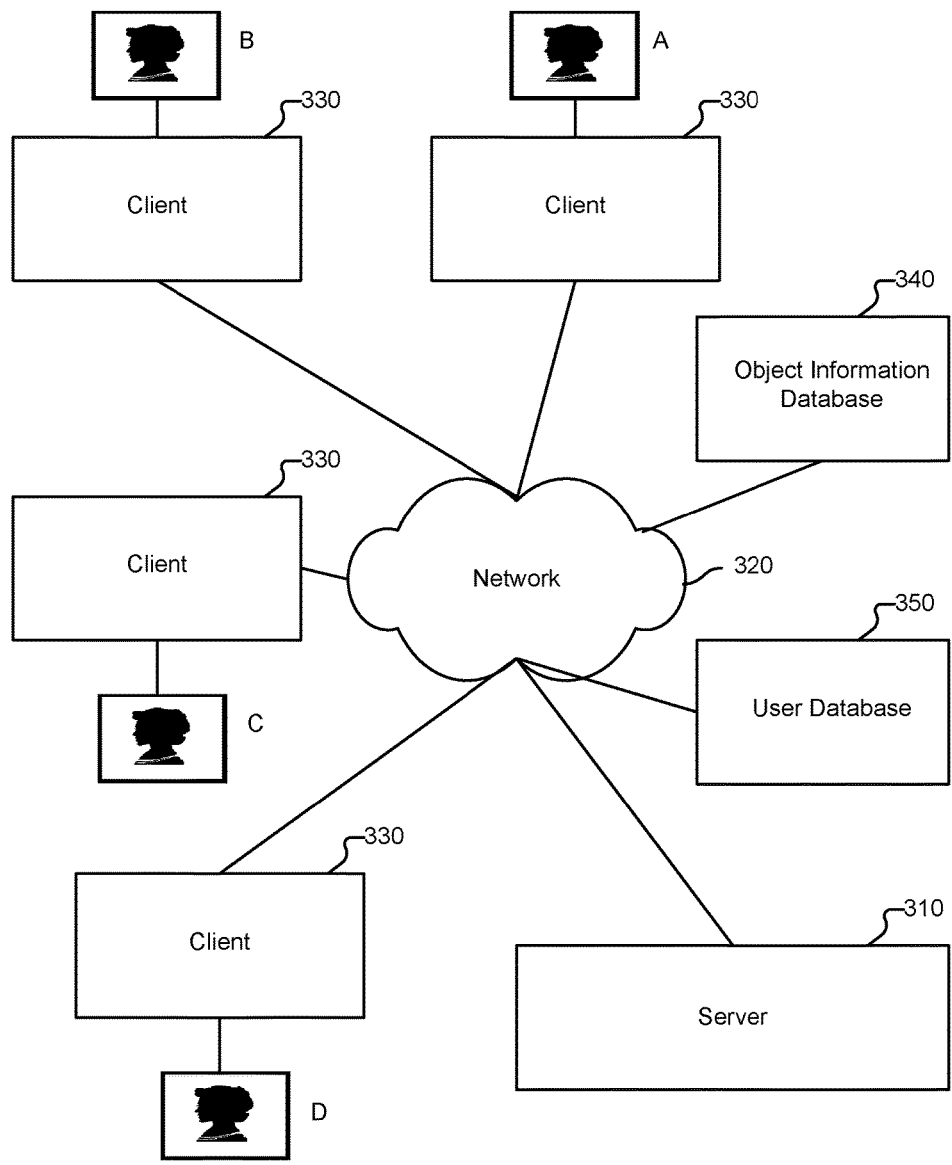
FIG. 3 is a structural diagram of an example of a system for recommending target object information.

FIG. 3 is a structural diagram of an example of a system for recommending target object information. The system 300 includes a server 310 that serves as an online shopping platform, for example, Taobao, Tmall, etc. Users log onto a website through client 330 and visit the server 310 of the commercial platform via a network 320. A user database 350 and an object information database 340 are connected to the server 310 and the client 330 via the network 320. The users select products that they wish to purchase from the products shown on the server 310.

Figure 4:
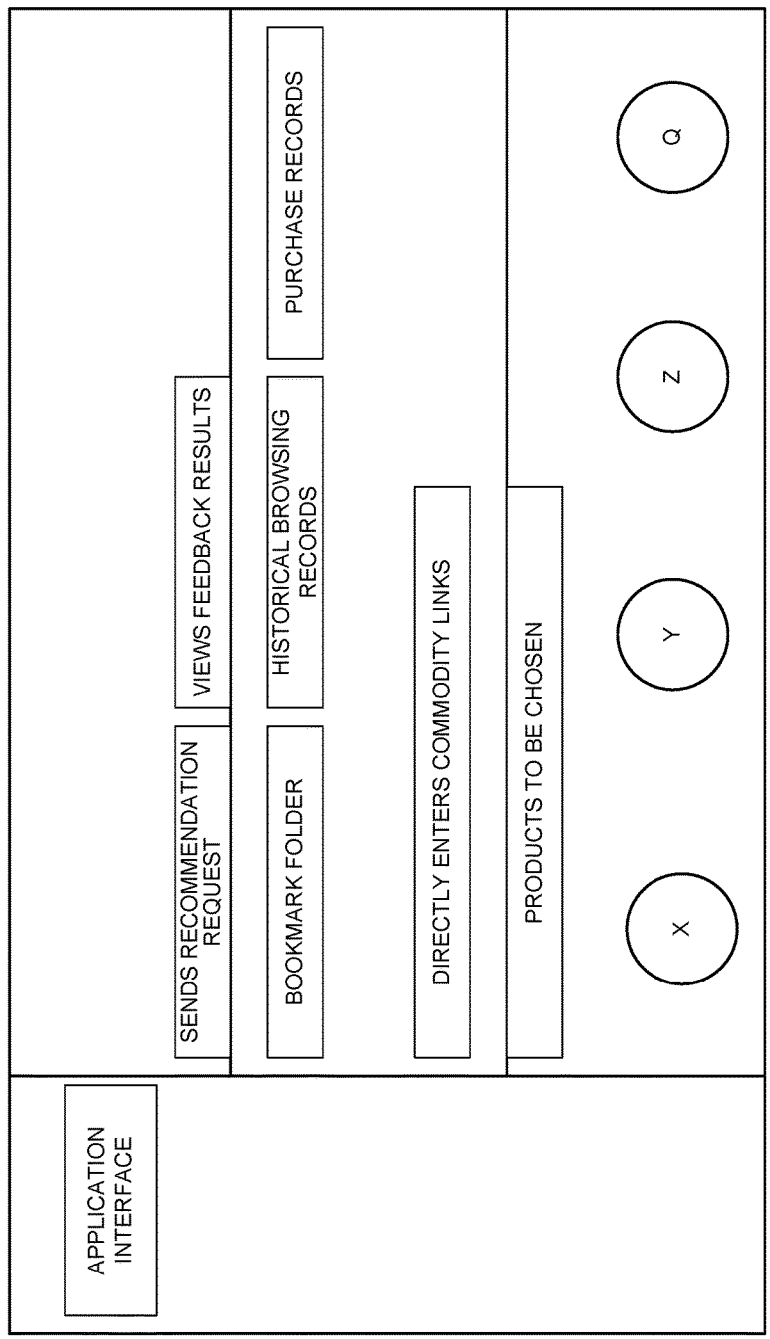
FIG. 4 is a schematic diagram of an example of a client browser display status in a system for recommending target object information.

FIG. 4 is a schematic diagram of an example of a client browser display status in a system for recommending target object information. In some embodiments, the client browser display status is implemented on the client 330 of FIG. 3. After user A, who corresponds to a first user, logs onto the e-commerce platform through a web page of the user's client 330, the first user selects from the products provided by the server 310 of the commercial platform. Once user A has determined a plurality of short-listed objects for the same type of product, user A selects one or more of the short-listed objects as products for final purchase and places an order. When presented with all the short-listed objects, user A is faced with many choices. Therefore, user A would like the server 310 to provide informational recommendations for products that are short-listed objects.

For example, the commercial platform server 310 provides an application that solicits recommendations from many users. After user A browses the Taobao website, user A wishes to purchase a shoulder bag. After browsing the Taobao website, user A selects 6 or 7 products as short-listed products. In some embodiments, the short-listed products are placed in a virtual shopping cart or wish list. However, user A finds choosing between the short-listed products very difficult. Therefore, the user selects an application such as the "My Taobao" interface in the browser of the client 330. After selecting the application, the user sends an informational recommendation application request. The request server 310 presents informational recommendations for the short-listed products which user A had selected. For example, first, the user selects products requiring recommendation and has the selected products serve as short-listed objects. When selecting information-recommended products, user A selects browsed products from the browser records, selects bookmarked products from the bookmark folder or selected products from purchase records, or directly enter a product link in a prompt field. Through the above means, the user selects products for additional informational recommendations.

For example, referring back to FIG. 4, four products X, Y, Z and Q exist. User A would like platform server 310 to invite a plurality of users to help user A by giving user A informational recommendations on the four products X, Y, Z and Q.

After user A selects the short-listed objects X, Y, Z and Q via a browser interface of the client 330, user A clicks the interface control on the client 320. The client 320 sends out a target object informational recommendation request.

Referring back to FIG. 2, in 220, the server determines historical selection information on the plurality of short-listed objects, the historical selection information comprising an historical count, a selection count, or any combination thereof. In some embodiments, the historical count is the number of times in the past that each short-listed object among the plurality of short-listed objects was selected by second users with the target object informational recommendation request being sent to a server. In some embodiments, the selection count is the number of times that the short-listed objects among target object informational recommendation requests (whose quantity is the historical count) were selected by the second users as target objects. As used herein, the first user is a user browsing a web page and preparing to select target objects. The second user is a user who has previously selected target objects.

As an example, the server performs table look-ups based on the characteristic information (for example, the categories to which the short-listed objects belong, names of the short-listed objects, item number, item ID, etc.) on the short-listed objects included in the target object informational recommendation request sent by the first user. In other words, the server looks up and confirms the historical selection information related to the short-listed objects in an object information database 340.

In some embodiments, the historical selection information includes the number of times that the second users select short-listed objects and the number of times that the second users select final target objects, such information being drawn from messages previously sent by second users to the server to acquire confirmation of target object information and/or information confirmation activities with respect to one or more of these short-listed objects. However, the historical information is not limited to the above two types of "number of times." In some embodiments, the historical information also includes evaluation information and other such information by the second user concerning the short-listed objects. In some embodiments, the confirmation of the target object information relates to the second user confirming that the target object is worth purchasing. In some embodiments, the information confirmation activities relates to which objects are worth purchasing from among the plurality of users' objects. Examples of the evaluation information include a good review, a mixed review, a poor review, etc.

The server determines the historical selection information corresponding to each short-listed object of the first user in the object information database. For example, the historical selection information relates to the number of times that each short-listed object has been selected as a short-listed object by all second users who have engaged in sending target object information confirmations, the number of times that final target objects have been selected by second users from the number of times that short-listed objects were selected this time, and the evaluation information of second users on the short-listed objects.

Accordingly, in some embodiments, the server acquires the historical selection information on the short-listed objects based on online counting or offline counting. Regarding the acquisition of the historical selection information based on the online counting, each time a user sends a target object informational recommendation request through a client, the server determines the historical selection information relating to the short-listed objects. Regarding the acquisition of the historical selection information based on offline counting, the server automatically saves the number of times that each short-listed object is selected to participate in information confirmation activities and the number of times that the short-listed object is selected as a final target object. Each time that the server receives a target object request sent by a new first user, the server looks up the data relating to the target objects in the object information database.

There are many ways to generate an entry of the historical selection information. For example, the server regards the number of times that one of a plurality of short-listed objects was selected by the first user or second users as short-listed objects as the historical count in the historical selection information. In addition, the server counts the number of times that the first user or the second users ultimately select one short-listed object as the final target object as the selection count for the short-listed objects.

In another example, after the first user has selected a plurality of short-listed objects, the first user autonomously selects N (N being an integer greater than 1) third users. For example, on a platform supporting social networking functions, users may identify other users as friends and request links to them (e.g., "follow" them) to establish social network connections. The social network connections are tracked by the server. Thus, the third user can be a friend of the first user, or the first user and the third user are following each other via their social network connections. The first user sends the selection information on the selected short-listed objects through the client to the N third users. Each of the N third users selects one or more short-listed objects that the each third user supports. At this point, the short-listed objects are recommended by the N third users, which count as N times within the historical count. In some embodiments, the number of times that the short-listed objects are recommended by the third user is added to the selection count in the historical selection information. As an example, a recommendation indicates that in the short-listed objects, a portion or all of the objects have been recommended by the third user.

In yet another example, after receiving a target object informational recommendation request, the server randomly selects N registered users to serve as third users. The server sends the selection information on the short-listed objects selected by the first user to the N third users. Each third user selects one or more short-listed objects that the each third user supports. At this point, the short-listed objects are recommended to the N third users, which count as N times within the historical count. In some embodiments, the number of times that the short-listed objects are supported by the third user is added to the selection count in the historical selection information. In other words, after product information of short-listed objects are sent to third users, each third user will separately support or recommend certain products among the candidate products. This support or recommend is similar to a vote where a plurality of third users vote for candidate products, and the number of votes can be used as the support information.

In the above examples, the server not only records choice records and selection records, but the server also saves the time whenever each short-listed object is selected as a short-listed object, the time when each short-listed object is selected as a target object, or any combination thereof, or the time when each short-listed object is recommended by a third user.

Referring back to FIG. 3 as an example, after the server 310 receives user A's request, the server 310 then performs a table look-up or an indexing approach to the object information database based on the content of the request and the characteristic information of the short-listed objects in order to determine the historical selection information for each short-listed object X, Y, Z and Q. In other words, data exists such as the number of times that the short-listed objects were selected to participate in informational recommendation activities and the number of times that the short-listed objects were selected, purchased, or a combination thereof. The number of times that the short-listed objects were selected, purchased, or a combination thereof is a subset of the number of times that the short-listed objects were selected to participate in the informational recommendation activities.

In 230, the server takes part of or all of the short-listed object historical selection information from among the plurality of short-listed objects, or support information obtained by referencing the historical selection information, and sends the historical selection information or the support information to the client.

As an example, the server looks up the historical count, i.e., the number of past times that each short-listed object was selected from the plurality of short-listed objects in order to participate in auxiliary requests and acquires the number of times that the short-listed objects were selected from among the number of past times of auxiliary requests to serve as the target product selections. In some embodiments, an auxiliary request allows the second user or the third user to assist the first user in selecting from the short-listed products. The server calculates a support ratio for each short-listed object based on the historical count and the selection count, and the server sends the support ratio as support information to the client so that the first user that selected the short-listed objects confirms the short-listed objects and acquires reliable data on the short-listed objects. The support ratio relates to the number of times a short-listed object is selected divided by the total number of selections N.

In another example, the historical selection information is directly sent to the client. The client then calculates a support ratio from the historical count and the selection count of the historical selection information.

For example, the historical count corresponding to the number of past times that short-listed object X is selected as a short-listed object is 1000, and the selection count corresponding to the number of times that a short-listed object A is selected as the final target object is 400. Thus, the support ratio for short-listed object A is 40%. In some embodiments, the server sends back only the short-listed objects with the highest support ratio or one or several short-listed objects whose support ratios are ranked at the top.

Referring back to FIG. 3, the server calculates the support ratio for at least one of the short-listed objects X, Y, Z and Q selected by the first user A and sends such data to the client so that the first user A may read the data.

In some embodiment, the server determines the support information on those short-listed objects with respect to their historical assistance request activities based on characteristic information of short-listed objects. Thus, the server presents target object informational recommendations enabling the user to confirm the business information reliability of short-listed objects based on reference data. This improves the timeliness and reliability when acquiring business object reliability and avoids communication resources waste, which occurs when users wait excessively long periods of time for feedback from other users.

In actual applications, because a large quantity of business objects that remain on Internet websites continuously for relatively long periods of time exist, some information may already be out of date. The first user may only wish to acquire historical selection information on short-listed objects from a recent time interval. In this case, after the first user has selected short-listed objects on the client, the user also sets a time range or selects a default recommended time range parameters set by the server. Subsequently, the client sends its target object informational recommendation request. Thus, the target object recommendation information request also includes the recommended time range parameters set by the first user.

Therefore, in some embodiments, the server receives a target object informational recommendation request issued by the first user. The server then reads the recommended time range parameters set by the first user from the target object informational recommendation request. The server determines the time range corresponding to the recommended time range parameters. Next, the server determines the historical selection information for the plurality of short-listed objects within the determined time range.

In some embodiments, because the server saves the time whenever a short-listed object is selected to be a short-listed object and the time whenever the short-listed object is to be selected as a final target object, the server looks up, in the object information database, the historical selection information for the plurality of short-listed objects within the time range corresponding to the recommended time range parameters based on the time range parameters. The server then calculates the short-listed object's support information, for example, support ratio, within the time range corresponding to the recommended time range parameters based on the historical selection information.

Using FIG. 3 as an example, the first user A wishes to acquire the historical selection information for the last month on a few short-listed objects that the first user A has selected. Thus, before sending the target object informational recommendation request, the first user A selects the time range relating to the most recent month. The server, after receiving the first user A's request, screens the short-listed object historical selection information so that the short-listed object historical selection information includes information related to the most recent month.

In the implementation modes described above, avoiding data redundancy, to increase precision and timeliness of business object informational recommendations, and to increase querying efficiency is possible.

Figure 5:
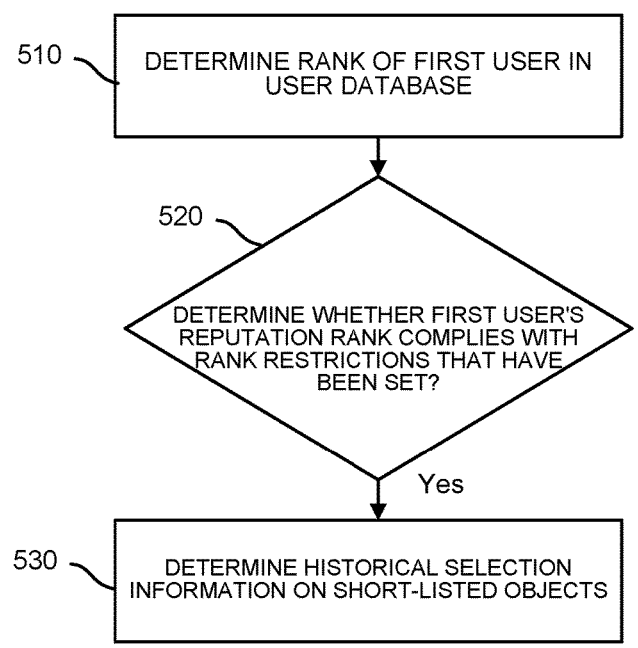
FIG. 5 is a flowchart of another embodiment of a method for recommending target object information.

In some embodiments, since target object informational recommendation requests require the expenditure of a large amount of network resources, the server becomes overloaded when some registered users continually send similar requests. In some embodiments, to avoid malicious requests and to reduce server loads, limits are imposed on users who send the requests. FIG. 5 is a flowchart of another embodiment of a method for recommending target object information. In some embodiments, the method 500 is performed prior to determining the historical selection information on the plurality of short-listed objects and comprises:

In 510, the server determines a reputation rank of the first user in a user database based on first user information.

In some embodiments, user ranks are determined according to the first user information and are recorded in user databases. The first user information includes user network behavior information. For example, the user network behavior information includes: user registration information, shopping information, access information, or any combination thereof.

In some embodiments, the first user information includes the first user's ID information or other information.

In some embodiments, the determination of the reputation rank is based on a user's review rating, whether a user has a VIP user registration, etc. For example, the user has a good review rating, a mixed review rating, a poor review rating, etc. The server sets the criteria for determining whether a user is qualified to make product recommendations, and rejects non-substantive recommendations to reduce the wasting of resources.

In 520, the server determines whether the first user's reputation rank complies with rank restrictions that have been set.

In some embodiments, the server sets a rank threshold for users who can reply to target object informational recommendation requests. For example, referring back to FIG. 3, the threshold is set which is to be reached in order to send target object informational recommendation requests.

Therefore, in some embodiments, prior to determining the historical selection information for short-listed objects, the server uses information in a target object recommendation request to acquire status information on the first user to assess whether the first user's rank meets the rank restrictions that have been set. For example, the server assesses whether the user's rank is above level 2. Thus, the server reduces extra loads and also ensures the reliability of the provided historical selection information.

Subsequently, if the user that sent the target object informational recommendation request this time complies with the set rank restrictions, the server determines the historical selection information based on the first user's request. If the user that sent the target object informational recommendation request this time does not comply with the set rank restrictions, the server rejects or stops the historical selection information query. Subsequently, the server queries the object information database for the historical selection information of the short-listed objects selected by the first user to calculate object support ratios.

In 530, in the event that the first user's reputation rank complies with the set rank restriction, the server determines the historical selection information on the plurality of short-listed objects of the first user.

For example, referring back to FIG. 3, the first user A is a user whose rank is above level 2. The server assesses that the first user A satisfies the rank restriction that the server set. Subsequently, the server begins to query the object information database for the historical selection information of the short-listed objects selected by the first user A to calculate object support ratios. If user M sends a target object informational recommendation request, and user M's rank is level 1, the request will not meet the rank restrictions set by the server. The server rejects user M's request, or the server does not provide an option for sending target object informational recommendation requests.

By using the above implementation modes, the server further reduces loads and also ensures reliability of provided data, and avoids the effects of malicious requests on the historical selection information.

In another embodiments, the target object informational recommendation requests received by the server include short-listed object attribute information, and prior to determining the historical selection information on the plurality of short-listed objects, the server detects whether attributes of the plurality of short-listed objects belong to preconfigured attribute standards. Examples of attribute standards include categories, product types, brands, prices, and other such information.

If the attributes of the plurality of short-listed objects belong to the preconfigured attribute standards, the server performs the corresponding historical selection information queries. Otherwise, if the attributes of the plurality of short-listed objects do not belong to the preconfigured attribute standards, the server queries only the historical selection information on one or more short-listed products that has the same attribute.

As an example, the server detects the attributes of the short-listed objects selected by the first user. Typically, the attributes of the objects that the first user chosen are the same. For example, assuming that the target object that the first user wishes to select is a pair of shoes. In that case, only products whose attribute is shoes have a reference value. Therefore, the server assesses whether the plurality of short-listed objects that were selected have the same attribute and belong to the same category. Thus, increasing the likelihood of validity of the historical selection information provided by the server and avoiding reduced data reference value, which results from comparisons between products having different attributes, is possible. In some embodiments, based on the support information, the avoidance of a reduced reference value means that the short-listed objects are comparable unlike, for example, clothes and shoes which should not be compared.

Returning to the example, because what first user A wishes to select is a shoulder bag, only comparison data on the products that are shoulder bags is significant. Because of an error by the first user A, shoes might also be added to the short-listed objects. At this point, the server assesses whether products that are short-listed objects have the same attribute based on short-listed object characteristic information, for example, product category and ID, included in the target object business recommendation request.

Figure 6A:
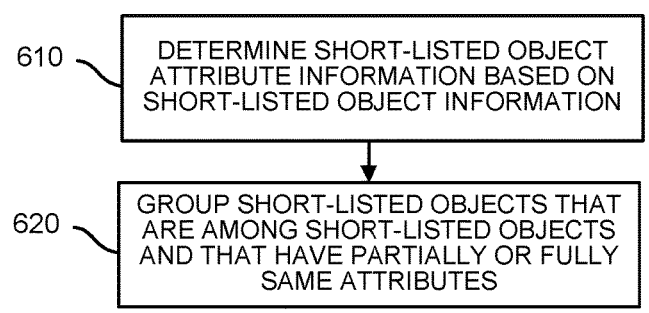
FIG. 6A is a flowchart of yet another embodiment of a method for recommending target object information.

FIG. 6A is a flowchart of yet another embodiment of a method for recommending target object information. In some embodiments, the method 600 is performed prior to the server determining the historical selection information on the plurality of short-listed objects and includes:

In 610, the server determines the short-listed object attribute information based on short-listed object information.

As an example, the server looks up short-listed object attributes, such as categories, product types, brands, prices, and other such information, in the object information database based on the short-listed object information.

In 620, the server groups the short-listed objects that are among the plurality of short-listed objects and that have partially or fully the same attributes based on attribute information (e.g., category information) of the plurality of short-listed objects.

First users have different ways of selecting short-listed objects. For example, a first user selects many short-listed objects in batches by going through the first user's browsing history. Therefore, in some embodiments, the short-listed objects have different attributes, for example, the short-listed objects belong to different categories. Referring back to FIG. 3, the first user A selects 50 short-listed objects. These 50 short-listed objects are in categories including shoes, pants, and hats. If the selected short-listed objects are not separated, the historical selection information and support information that the user acquires will lack a reference value. Therefore, the short-listed objects are to be divided into groups of short-listed objects having the same category.

After the determining of the historical selection information on the plurality of short-listed objects, the server sends back according to the groups the support information on the short-listed objects in each group.

For example, following the division of the plurality of short-listed objects into groups, the category corresponding to shoes contains 8 short-listed objects, and the category corresponding to pants contains 10 short-listed objects. Therefore, for the shoe category group, the server sends back the support ratios for the one or two short-listed objects that have higher ranked support ratios. For the pants category group, the server sends back the support ratios for the one or two short-listed objects that have higher ranked support ratios. In some embodiments, the server sends back one or two short-listed objects, and the first user finally selects a desired short-listed object. In some embodiments, the server sends back three short-listed objects, and the first user finally selects a desired short-listed object.

Figure 6B:
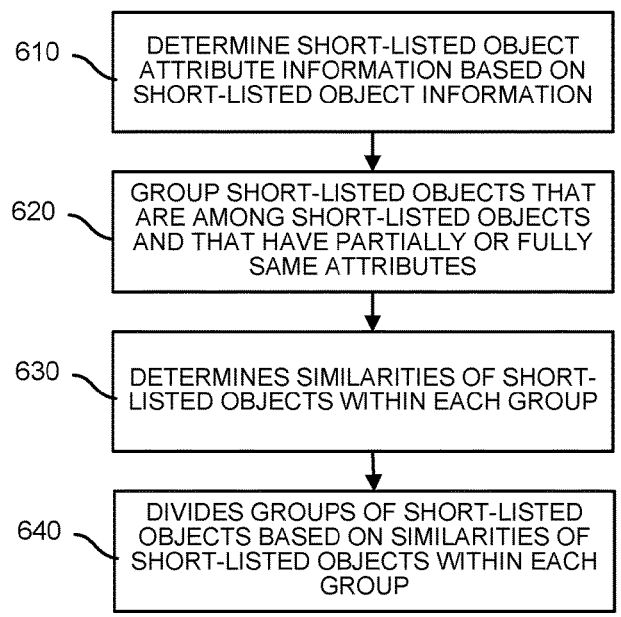
FIG. 6B is a flowchart of yet another embodiment of a method for recommending target object information.

In addition, in some embodiments, the plurality of short-listed objects selected by the first user belong to the same category, but in the case of two objects of the short-listed objects belonging to the same category, a relatively large dissimilarity between the two objects exists. For example, the shoes of a first-tier brand and the shoes of a third-tier brand belong to the same category, but are very dissimilar. FIG. 6B is a flowchart of yet another embodiment of a method for recommending target object information. In some embodiments, the method 650 is performed after the grouping of the short-listed objects that are among the plurality of short-listed objects that have the same attributes and comprises:

In some embodiments, the first two operations of method 650 correspond with operations 610 and 620 of FIG. 6A and will not be further described for conciseness.

In 630, the server determines similarities of the plurality of short-listed objects within each group.

As an example, after the server divides into groups the plurality of short-listed objects based on the short-listed object attribute information, the server uses such attribute information as brand and price to calculate the similarities of the short-listed objects having the same attribute. For example, first-tier brand shoes are very similar. In some embodiments, similarity is computed based on attribute standards. If differences between the attribute standards of the short-listed objects are similar (for example, the objects are of the same brand or have a similar price), then the short-listed objects are deemed to be similar. Otherwise, the short-listed objects are deemed to be dissimilar. In some embodiments, if the differences between the attribute standards of the short-listed objects are below a predetermined threshold, the attribute standards of the short-listed objects are similar.

In 640, the server divides the groups of short-listed objects based on the similarities of the short-listed objects within each group.

As an example, the server performs a secondary grouping of short-listed objects that have the same attribute and that are highly similar based on short-listed object similarity. For example, in the category corresponding to shoes, the server puts first-tier brand shoes into one secondary group and puts second-tier brand shoes into another secondary group.

After the server determines the historical selection information on the plurality of short-listed objects, the server sends support information on short-listed objects in each secondary group based on the secondary group division back to the client.

As an example, after the secondary grouping, the server sends back one or more short-listed objects whose support ratios are ranked higher from the short-listed objects in each group.

Increasing the validity of historical selection information provided by the server and avoiding a reduced data reference value which results from comparisons between products having different attributes is possible, thus facilitating user selection and confirmation.

In some embodiments, the target object informational recommendation requests received by the server include short-listed object link addresses. An example of a link address includes a URL. Therefore, prior to determining the historical selection information on the short-listed objects, the server also detects whether link addresses of any of the short-listed objects among the plurality of short-listed objects is valid or not.

As an example, the short-listed objects selected by the first user might be selected from a browsing log. Therefore, in some embodiments, the link addresses of the short-listed objects involve invalid conditions. For example, an invalid condition includes that the merchandise has been removed from the shelves or may not be in stock. Therefore, the server monitors the link addresses of the short-listed objects to determine whether the link addresses are valid. If a link address is invalid, the server reports information on the invalidity of the link address to the client. An example of the link address being invalid is a URL error. The server only determines the historical selection information on short-listed objects with valid link addresses. Accordingly, historical selection information on short-listed objects with invalid links does not have much reference value for the first user.

Referring back to FIG. 3, for example, when the user A adds a short-listed object, he adds the short-listed object through a page, an address link, or a browsing log. In another example, the user A adds the short-listed object using a bookmark folder or in some other way. In some embodiments, when the request is sent, the short-listed object is already in an unavailable state. Therefore, the server verifies this information. The server no longer provides historical selection information for products that were removed from the shelves or no longer on sale, and the server discontinues informational recommendation processing.

Therefore, the above approach increases the precision of business object reliability assessments.

Figure 7:
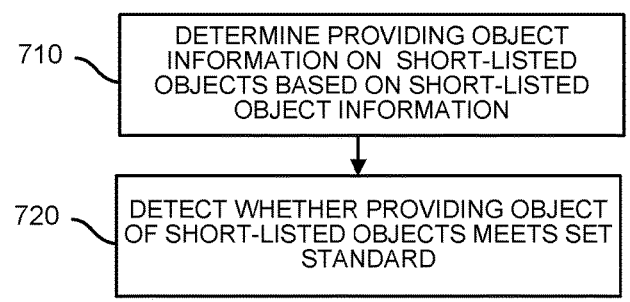
FIG. 7 is a flowchart of yet another embodiment of a method for recommending target object information.

In some embodiments, the target object informational recommendation requests received by the server include information, for example, identifier (ID), on the plurality of short-listed objects. FIG. 7 is a flowchart of yet another embodiment of a method for recommending target object information. In some embodiments, the method 700 is performed prior to the determining of historical selection information on the plurality of short-listed objects and comprises:

In 710, the server determines providing object information on the short-listed objects based on the short-listed object information. For example, the providing object information includes photos of the short-listed objects, sellers of the short-listed objects, product descriptions of the short-listed objects, URLs of the short-listed objects, or any combination thereof.

In some embodiments, the information relating to the providing object relates to a reputation standard. As an example, if the first user pays attention only to products from sellers with higher reputations, the first user selects the providing object standard, for example, the providing object reputation standard, for any short-listed object on the client page. For example, attention is paid only to the historical selection information on products provided by high-level providers. Therefore, the target object informational recommendation request sent by the first user has attached to the request a reputation standard selected and set by the first user. The server looks up rank information on providing objects for short-listed objects in the object information database based on short-listed object IDs included in the target object informational recommendation requests.

In 720, the server detects whether the providing object of any of the plurality of short-listed objects meets a set standard.

As an example, after the server determines a reputation level for the providing object on the short-listed objects, the server compares the reputation level to the reputation standard requirements set by the first user. If the provider of the short-listed object does not meet the reputation standard set by the first user through the client, the historical selection information on the short-listed object is deleted. In some embodiments, only the historical selection information on short-listed objects that meet the set reputation standard is provided.

For example, in order to assure the quality of products, the first user A wishes only to select products provided by sellers with relatively high reputations. Therefore, the first user A pays attention only to historical selection information on products provided by high-reputation sellers. Therefore, before sending the target object recommendation request, the first user A selects a setting for the seller reputation standard range on the web page. For example, if the setting is royal-class seller, the server, after receiving the request from first user A, conducts automatic screening and does not count historical selection information on products provided by merchants whose seller reputation fails to attain the royal level. In some embodiments, the royal class or the royal level is the highest level of seller reputation.

Based on the above method, avoiding information that does not interest the querying user is possible. The above method also increases querying efficiency and conserves communication resources.

The several above optional implementation modes described may be selected and executed in any order and in any combination. The sequence described above merely served to facilitate the description and should not be interpreted as a limitation on the present application.

Through the above embodiments, the server acquires historical selection information on the short-listed objects for the reference of the first user in confirming the reliability of the short-listed objects and for selection therefrom of target objects. Thus, the server acquires and records the target objects that the first user, based on the historical selection information on the plurality of short-listed objects, selects from the plurality of short-listed objects, to update the historical selection information on these short-listed objects, and to provide the historical selection information on these short-listed objects for the reference of the next first user.

Figure 8:
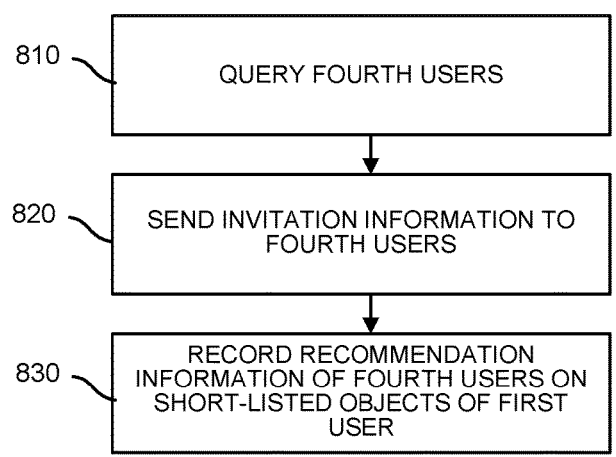
FIG. 8 is a flowchart of yet another embodiment of a method for recommending target object information.

FIG. 8 is a flowchart of yet another embodiment of a method for recommending target object information. In some embodiments, the method 800 is implemented by the server 110 of FIG. 1 and comprises:

In 810, the server queries fourth users. The fourth users have a connection to the short-listed objects. The fourth users have made at least one of the short-listed objects a final target object.

As an example, the server determines, from the object information database, the users who purchased or used a certain short-listed object as the fourth users.

In 820, the server sends invitation information to the fourth users, the invitation information being for inviting the fourth users to carry out target object informational recommendations regarding the short-listed objects of the first user.

As an example, the server sends to one or more fourth users that it has looked up invitation messages inviting the fourth users to evaluate, vote on, or grade short-listed objects that the fourth users have used.

In 830, the server records recommendation information of the fourth users on the short-listed objects of the first user, and takes the recommendation information of the fourth users regarding the short-listed objects as support information for the short-listed objects.

As an example, the server regards the recommendation information, such as ratings, on a product that is a short-listed object as support information on the short-listed object, and sends the recommendation information to a client for the reference of the user.

In some embodiments, the server not only sends the historical support information on the short-listed objects back to the first user for reference of the first user, but the server also sends short-listed object evaluation information and uses information from users who used or purchased the short-listed objects to a client for the reference of the user.

Figure 9:
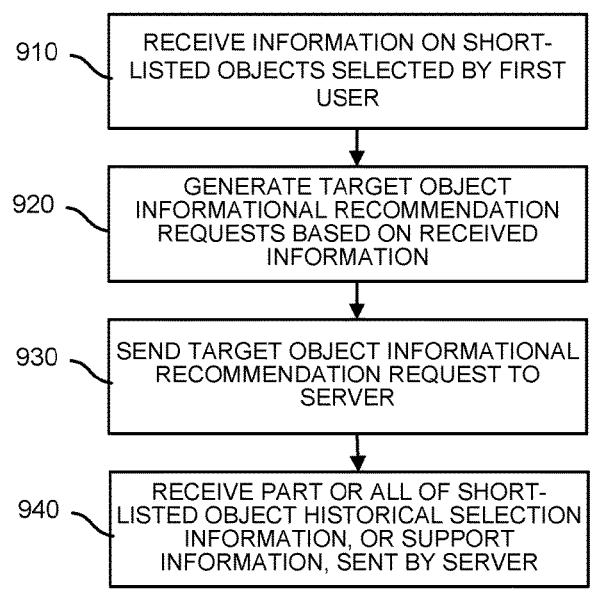
FIG. 9 is a flowchart of yet another embodiment of a method for recommending target object information.

FIG. 9 is a flowchart of yet another embodiment of a method for recommending target object information. In some embodiments, the method 900 is implemented by the client 120 of FIG. 1 and comprises:

In 910, the client receives information on a plurality of short-listed objects selected by a first user.

As an example, clients include smart phones, tablet computers, personal computers, etc. The first user visits an Internet website via the client, browses business objects displayed on the corresponding web pages of the website, and selects business objects to determine the final target objects. For example, the product objects displayed on the corresponding web pages of the website are business objects, for example, physical products, virtual products, valuable information, etc. The final target objects are confirmed by browsing the business objects on the corresponding web pages and by selecting business objects. The first user selects a plurality of business objects as short-listed objects based on the business objects displayed on web pages on the client.

The ways in which the first user selects short-listed objects include adding short-listed objects via bookmark records in a bookmark folder, adding short-listed objects via a browsing log in historical browsing records, adding short-listed objects by entering short-listed object link addresses, etc.

Referring back to FIG. 3, the server 310 is an e-commerce platform, such as Taobao or Tmall, providing online shopping. The user accesses the business platform server 310 via the client 330 and selects products that the user wants to purchase from the products displayed on the business platform server 310.

After user A, who is a first user, logs onto the e-commerce platform through the web page of client 330, as shown in FIG. 4, the user A makes selections from the plurality of products provided by the server 310 of the commercial platform. With the first user A having determined a plurality of short-listed objects within the same category of products, the first user A selects one or more of the plurality of short-listed objects as products for final purchase and issues an order. Because the short-listed objects are before the first user A, the first user A is faced with many choices. Thus, the first user A desires that the server 310 provides informational recommendations concerning products that are short-listed objects.

For example, the commercial platform server 310 provides an application that solicits recommendations from many users. After first user A browses Taobao, the first user A wishes to purchase a shoulder bag. After browsing the server 310, the first user A selects 6 or 7 short-list products, yet the first user A finds it very difficult to choose between some of the products on the short list. First of all, the user selects products that require the addition of informational recommendations, these products being the short-listed objects. When selecting information-recommended products, the first user A selects browsed products from the browser records, selects bookmarked products from the bookmark folder, selects products from shopping records, directly enters a product link in a prompt field, or any combination thereof. In some embodiments, the user selects products having the addition of informational recommendations.

For example, referring back to FIG. 4, four products X, Y, Z and Q exist. The first user A desires that the server 310 of the business platform invites a plurality of users to give informational recommendations on the four products X, Y, Z and Q.

Referring back to FIG. 9, in 920, the client generates target object informational recommendation requests based on the received information, the requests including information on the plurality of short-listed objects selected by the first user.

As an example, after the first user selects the plurality of short-listed objects on the client, the client generates the target object informational recommendation requests based on the selected information. In some embodiments, the target object informational recommendation requests include characteristic information on the short-listed objects selected by the first user. Examples of the characteristic information include one or more of the following: the category to which the short-listed object belongs, name of the short-listed object, number, ID, link address URLs, and other information.

For example, after the first user A selects the short-listed objects X, Y, Z and Q via the browser interface of the client 330, the first user A clicks an interface control on the client 330 triggering the client to generate a target object informational recommendation request. The target object recommendation request that is generated includes information on the short-listed objects X, Y, Z and Q.

In 930, the client sends the target object informational recommendation request to the server.

As an example, after the client generates the target object informational recommendation request for the short-listed objects selected by the first user, the client sends the target object informational recommendation request via the Internet or the network 320 to the server. The server provides historical selection information feedback for the short-listed objects.

In 940, the client receives part or all of the short-listed object historical selection information and/or support information, sent by the server. In some embodiments, the historical selection information includes the historical count, i.e., the number of past times that each short-listed object among the plurality of short-listed objects was selected by second users with the target object informational recommendation request being sent to a server and the selection count, i.e., the number of times that said short-listed objects among target object informational recommendation requests (whose quantity is the historical count) were selected by the second users as target objects. The support information is support information that refers to the historical count and the selection count and is acquired for at least one short-listed object among the short-listed objects.

In some embodiments, the first user makes selections based on the historical count for the short-listed objects, the selection count, the support information, or any combination thereof.

As an example, when the client receives the historical count and the selection count, the client calculates the support information from the historical count and the selection count. Thus, support information on one or more of the short-listed objects sent back by the server is received. In some embodiments, the support information includes a historical support ratio for the short-listed objects and evaluation information on the short-listed objects. The support ratio is calculated in the same way as described above and thus the calculation is omitted for conciseness.

Referring back to FIG. 3, after the server receives the target object informational recommendation request sent by the client, the server looks up the historical count, i.e., the number of past times that the short-listed objects X, Y, Z and Q were selected as short-listed objects and the selection count, i.e., the number of times that they were ultimately selected as target objects and thereby obtains the support ratio for each short-listed object. Assume that the support ratio for X is 30%, the support ratio for Y is 50%, the support ratio for Z is 18%, and the support ratio for Q is 40%. Therefore, in some embodiments, the server chooses to send back support information only for the short-listed object Y, which has the highest support ratio and recommends Y to the first user. The client only displays the support information for Y. In some embodiments, the server sends back the support ratios for short-listed objects Y and Q, whose support ratios are the two highest-ranked, to the client. The client displays the support ratios for Y and Q and recommends both to the user A.

In some embodiments, the support ratio is calculated by the server. The server only sends back the number of past times that short-listed objects were selected as short-listed objects (the historical count) and the number of times that the short-listed objects were selected as target objects (the selection count) to the client. The client calculates the support ratio for each short-listed object.

The method 900 enables the user to confirm product information, and is able to conserve communication resources.

Figure 10:
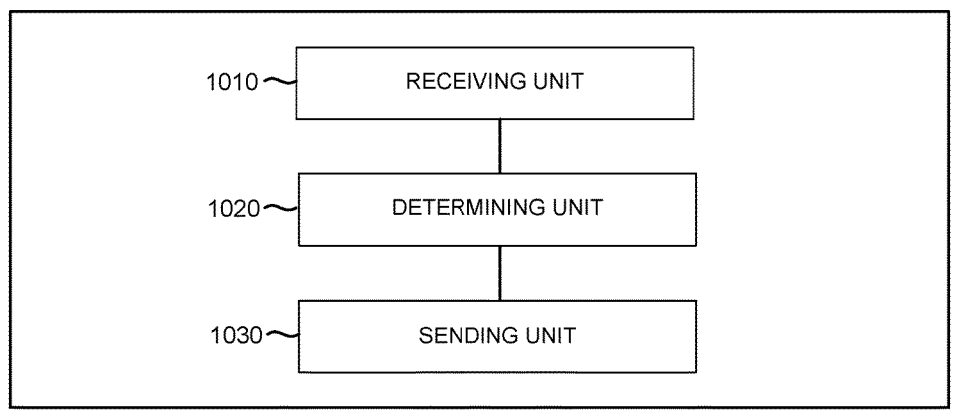
FIG. 10 is a structural diagram of an embodiment of a server for recommending target object information.

FIG. 10 is a structural diagram of an embodiment of a server for recommending target object information. In some embodiments, the server 1000 comprises a receiving unit 1010, a determining unit 1020, and a sending unit 1030.

The receiving unit 1010 receives target object informational recommendation requests, the requests including information on a plurality of short-listed objects selected by a first user.

The determining unit 1020 determine historical selection information on the plurality of short-listed objects, the historical selection information including a historical count being the number of past times that each short-listed object among the plurality of short-listed objects was selected by second users with the target object informational recommendation request being sent to a server and/or the selection count being the number of times that the short-listed objects among the target object informational recommendation requests (whose quantity is the historical count) were selected by the second users as target objects.

The sending unit 1030 takes part or all of the plurality of short-listed object historical selection information or support information obtained by referencing historical selection information and sends the historical selection information or the support information to a client.

As an example, when the first user has the plurality of short-listed objects available to the first user through various browsers, such as personal computers (PCs), smart phones, tablet computers, and other clients, the first user sends a target object informational recommendation request by triggering a control of the client browser or application interface. The receiving unit 1010 receives the target object informational recommendation requests and at the same time acquires characteristic information, such as categories and names, on the plurality of short-listed objects within a target object informational recommendation request.

The determining unit 1020 looks up and determines the historical selection information on each short-listed object in the object information database based on the content of the target object informational recommendation request and the acquired characteristic information on the short-listed objects. In other words, the number of past times that the objects were selected as short-listed objects (the historical count), the number of times that the objects were selected to participate in helping with choices, the number of times that the above short-listed objects were selected as final target objects (the selection count), and other such data.

After the determining unit 1020 acquires the historical selection information on the acquired short-listed objects, the sending unit 1030 sends the historical selection information or the support information (that was acquired with reference to the historical selection information) to a client. The acquired information is displayed via the client for user reference.

Figure 11:
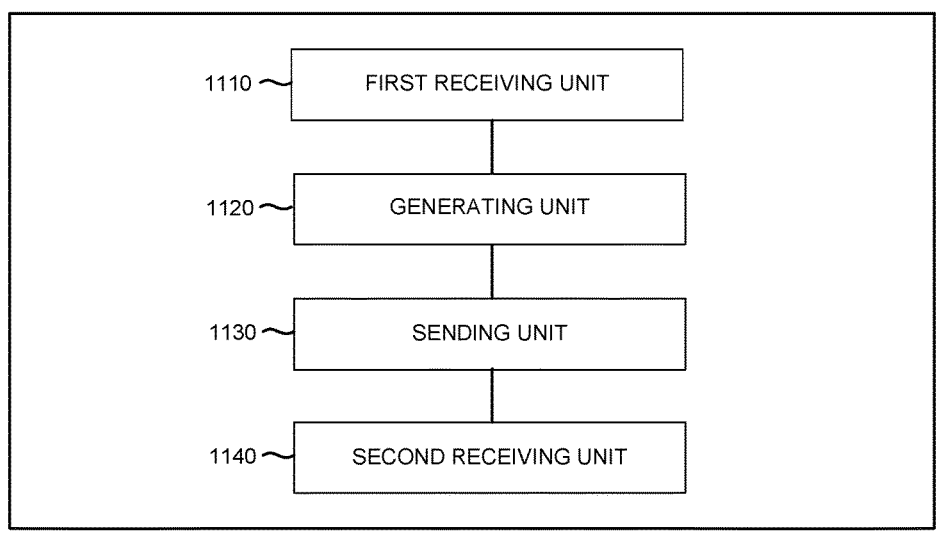
FIG. 11 is a structural diagram of an embodiment of a client for recommending target object information.

FIG. 11 is a structural diagram of an embodiment of a client for recommending target object information. In some embodiments, the client 1100 includes a first receiving unit 1110, a generating unit 1120, a sending unit 1130, and a second receiving unit 1140.

The first receiving unit 1110 receives information selected by a first user on a plurality of short-listed objects.

The generating unit 1120 generates target object informational recommendation requests based on the received information, the target object informational recommendation requests including information on the plurality of short-listed objects selected by the first user.

The sending unit 1130 determines historical selection information on the plurality of short-listed objects based on the target object recommendation requests and sends the target object informational recommendation requests to a server, the historical selection information including a historical count, the historical count being the number of past times that each short-listed object was selected from the plurality of short-listed objects by second users with the target object information recommending request being sent to a server and/or the selection count, the selection count being the number of times that the short-listed objects were selected from past target object informational recommendation requests (whose quantity is said historical count) by the second users as target objects.

The second receiving unit 1140 receives part or all of the short-listed object historical selection information or support information sent by the server, the support information referring to the number of past times and the number of selections and being support information for at least one short-listed object acquired from the short-listed objects.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recommending target object information, comprising:
    receiving, using a processor, a target object informational recommendation request, the target object informational recommendation request including information pertaining to a plurality of short-listed objects selected by a first user;
    determining, using the processor, whether a reputation rank of a second user in a user database is equal to or exceeds a reputation threshold, wherein the reputation rank of the second user is determined based on first historical selection information on product provided by the second user;
in the event that the reputation rank of the second user is equal to or exceeds the reputation threshold, regarding the second user as a reputed user;
in the event that the reputation rank of the second user fails to equal or exceed the reputation threshold, regarding the second user as a non-reputed user;
determining, using the processor, historical selection information of the plurality of short-listed objects, the historical selection information including a historical count, a selection count, or both, the historical count corresponding to number of past times that each short-listed object was selected with past target object information recommending request being sent to a server, and the selection count corresponding to number of times that each short-listed object was selected from past target object informational recommendation requests by reputed users as a target object, wherein the determining of the historical selection information of the plurality of short-listed objects comprises:
    determining a second historical selection information of the plurality of short-listed objects provided by the non-reputed user; and
    removing the second historical selection information from the historical selection information of the plurality of short-listed objects to obtain updated historical selection information; and
sending a portion of the historical selection information to a client, wherein the portion of the historical selection information corresponds to the updated historical selection information.

2. The method as described in claim 1, further comprising:
selecting, based at least in part on the historical selection information, at least some of the historical selection information from among the plurality of short-listed objects;
determining support information of the part or all of the short-listed object based at least in part the historical selection information; and
sending the support information to the client.

3. The method as described in claim 2, further comprising:
after sending the support information on at least one of the plurality of short-listed objects to a client:
    recording the target object selected by the first user from among the plurality of short-listed objects according to the historical selection information of the plurality of short-listed objects; and
    regarding selection made this time by the first user as one instance of historical selection information of the target object.

4. The method as described in claim 1, wherein the historical selection information comprises evaluation information by the reputed users on the short-listed objects.

5. The method as described in claim 1, wherein:
the target object informational recommendation request includes recommended time range parameters; and
the determining of the historical selection information of the plurality of short-listed objects comprising:
    determining a time range corresponding to the recommended time range parameters; and
    determining the historical selection information of the plurality of short-listed objects within the time range.

6. The method as described in claim 1, wherein the target object informational recommendation requests include first user information; and further comprising:
prior to the determining of the historical selection information of the plurality of short-listed objects:
    looking up a rank of the first user in a user database based on first user information;
    assessing whether the rank of the first user complies with rank restrictions that have been set; and
    in the event that the rank of the first user complies with the rank restrictions that have been set, executing the determining of the historical selection information of the plurality of short-listed objects of the first user.

7. The method as described in claim 1, wherein the target object informational recommendation request includes attribute information on the plurality of short-listed objects; and
wherein the method further comprises:
    prior to the determining of the historical selection information of the plurality of short-listed objects, detecting whether attributes of the plurality of short-listed objects belong to a set of preconfigured attribute standards,
wherein the determining of the historical selection information of the plurality of short-listed objects comprises determining the historical selection information of the short-listed objects that, among the plurality of short-listed objects, have attributes that belong to the set of preconfigured attribute standards.

8. The method as described in claim 1, further comprising:
prior to the determining of the historical selection information of the short-listed objects:
    determining attribute information of the plurality of short-listed object based on the information pertaining to the plurality of short-listed objects;
    grouping short-listed objects that are among the plurality of short-listed objects and that have the same attributes based on the attribute information on the plurality of short-listed objects; and
    after the determining of the historical selection information of the plurality of short-listed objects, sending back, in accordance with group divisions, support information on short-listed objects of each group.

9. The method as described in claim 8, further comprising:
after the grouping of the short-listed objects that are among the plurality of short-listed objects and that have the same attributes:
    determining similarities of the plurality of short-listed objects within each group;
    dividing the plurality of short-listed objects within each group into second-division groups based on the similarities of the plurality of short-listed objects within each group; and
    after the determining of the historical selection information of the plurality of short-listed objects, sending support information on short-listed objects of each of the second-division groups back to the client.

10. The method as described in claim 8, wherein the support information is a support ratio of the short-listed objects, the sending of the support information on at least one of the plurality of short-listed objects to a client comprises:
    determining whether a short-listed object has a higher support ratio than a preset threshold, wherein the support ratio is based on the historical count and the selection count; and sending the support information on one or more of the short-listed objects with support ratios higher than the preset threshold to a client.

11. The method as described in claim 1,
wherein the target object informational recommendation requests include link addresses for the plurality of short-listed objects; and further comprising:
prior to the determining of the historical selection information of the plurality of short-listed objects, detecting whether a link address of a short-listed object is valid,
wherein the determining of the historical selection information of the plurality of short-listed objects comprises:
determining the historical selection information of short-listed objects with valid link addresses.

12. The method as described in claim 1, wherein the target object informational recommendation requests includes information on the plurality of short-listed objects; and
wherein the method further comprises:
prior to the determining of the historical selection information of the plurality of short-listed objects:
determining information on a providing object of the short-listed objects based on the short-listed object information; and
detecting whether the providing object of any one of the plurality of short-listed objects meeting a preconfigured standard based on the short-listed object information,
wherein the determining of the historical selection information of the plurality of short-listed objects includes determining the historical selection information of short-listed objects whose providing objects meet set standards.

13. The method as described in claim 1, further comprising:
after receiving the target object informational recommendation request sent by the first user, the request including the information on the plurality of short-listed objects selected by the first user:
determining a third user of the server;
issuing a participation request to the third user to invite the third user to make target object informational recommendations regarding short-listed objects of the first user;
recording recommendation information of the third user on the short-listed objects of the first user; and
taking the recommendation information of the third user regarding the short-listed objects as one instance of historical selection information of the short-listed objects.

14. The method as described in claim 1, further comprising:
sending invitation information to fourth users to invite the fourth users to perform target object informational recommendations regarding the short-listed objects of the first user;
recording recommendation information of the fourth users on the short-listed objects of the first user; and
taking the recommendation information of the fourth users regarding the short-listed objects as support information for the short-listed objects.

15. The method as described in claim 14, wherein the fourth users are users associated with the short-listed objects, the fourth users being users who have selected at least one of the plurality of short-listed objects as the target object.

16. A method for recommending target object information, comprising:
receiving, using a processor, information on a plurality of short-listed objects selected by a first user;
generating, using the processor, a target object informational recommendation request based on selected information, the target object informational recommendation request including information on the plurality of short-listed objects selected by the first user;
sending, using the processor, the target object informational recommendation requests to a server so that the server is configured to:
determine whether a reputation rank of a second user in a user database is equal to or exceeds a reputation threshold, wherein the reputation rank of the second user is determined based on first historical selection information of product provided by the second user,
in the event that the reputation rank of the second user is equal to or exceeds the reputation threshold, regard the second user as a reputed user,
in the event that the reputation rank of the second user fails to equal or exceed the reputation threshold, regard the second user as a non-reputed user, and
determine historical selection information of the plurality of short-listed objects based on the target object recommendation request, the historical selection information including a historical count that corresponds to number of past times that each short-listed object was selected with a target object information recommending request being sent to the server, a selection count that corresponds to number of times that each short-listed object was selected from past target object informational recommendation requests by reputed users as a target object, or both, wherein the determining of the historical selection information of the plurality of short-listed objects comprises to:
determine a second historical selection information of the plurality of short-listed objects provided by the non-reputed user; and
remove the second historical selection information from the historical selection information of the plurality of short-listed objects to obtain updated historical selection information; and
receiving a portion of the historical selection information, or support information, sent by the server, the support information being support information that refers to the number of past times and a number of selections and is acquired for at least one short-listed object among the short-listed objects, wherein the portion of the historical selection information corresponds to the updated historical selection information.

17. The method as described in claim 16, wherein:
the receiving of the information on the plurality of short-listed objects selected by the first user comprises:
receiving short-listed objects selected by the first user through a bookmark folder or historical browsing records, the received information including the information on the plurality of short-listed objects; and
the target object informational recommendation request includes information on the plurality of short-listed objects selected by the first user.

18. The method as described in claim 16, wherein:
the receiving of information selected by the first user on the plurality of short-listed objects includes:
receiving short-listed objects selected by the first user through link addresses, the received information including the link addresses on the short-listed objects; and
the target object informational recommendation request including the link addresses for the plurality of short-listed objects selected by the first user.

19. The method as described in claim 16, wherein the support information is support information for at least one short-listed object acquired from the short-listed objects with reference to the number of past times and the number of selections.

20. A server for recommending target object information, comprising:
at least one processor configured to:
receive a target object informational recommendation request, the target object informational recommendation request including information pertaining to a plurality of short-listed objects selected by a first user;
determine whether a reputation rank of second user in a user database is equal to or exceeds a reputation threshold, wherein the reputation rank of the second user is determined based on first historical selection information of product provided by the second user;
in the event that the reputation rank of the second user is equal to or exceeds the reputation threshold, regard the second user as a reputed user;
in the event that the reputation rank of the second user fails to equal or exceed the reputation threshold, regard the second user as a non-reputed user;
determine historical selection information of the plurality of short-listed objects, the historical selection information including a historical count, a selection count, or both, the historical count corresponding to number of past times that each short-listed object was selected with past target object information recommending request being sent to a server, and the selection count corresponding to number of times that each short-listed object was selected from past target object informational recommendation requests by reputed users as a target object, wherein the determining of the historical selection information of the plurality of short-listed objects comprises to:
determine a second historical selection information of the plurality of short-listed objects provided by the non-reputed user; and
remove the second historical selection information from the historical selection information of the plurality of short-listed objects to obtain updated historical selection information; and
send a portion of the historical selection information to a client, wherein the portion of the historical selection information corresponds to the updated historical selection information; and
a memory coupled to the at least one processor and configured to provide the at least one processor with instructions.

21. A client for recommending target object information, comprising:
at least one processor configured to:
receive information on a plurality of short-listed objects selected by a first user;
generate target object informational recommendation requests based on selected information, the target object informational recommendation requests including information pertaining to the plurality of short-listed objects selected by the first user;
send the target object informational recommendation requests to a server so that the server is configured to:
determine whether a reputation rank of a second user in a user database is equal to or exceeds a reputation threshold, wherein the reputation rank of the second user is determined based on first historical selection information of product provided by the second user,
in the event that the reputation rank of the second user is equal to or exceeds the reputation threshold, regard the second user as a reputed user,
in the event that the reputation rank of the second user fails to equal or exceed the reputation threshold, regard the second user as a non-reputed user, and
determine historical selection information of the plurality of short-listed objects based on the target object informational recommendation requests, the historical selection information including a historical count, a selection count, or both, the historical count corresponding to number of past times that each short-listed object was selected with a past target object information recommending request being sent to the server, and the selection count corresponding to number of times that each short-listed object was selected from past target object informational recommendation requests by reputed users as a target object, wherein the determining of the historical selection information of the plurality of short-listed objects comprises to:
determine a second historical selection information of the plurality of short-listed objects provided by the non-reputed user; and
remove the second historical selection information from the historical selection information of the plurality of short-listed objects to obtain updated historical selection information; and
receive a portion of the historical selection information, or support information sent by the server, the support information being support information that refers to the number of past times and a number of selections and is acquired for at least one short-listed object among the short-listed objects, wherein the portion of the historical selection information corresponds to the updated historical selection information; and
a memory coupled to the at least one processor and configured to provide the at least one processor with instructions.

22. A computer program product for recommending target object information, the computer program product being embodied in a tangible non-transitory computer readable storage medium and comprising computer instructions for:
receiving a target object informational recommendation request, the target object informational recommendation request including information pertaining to a plurality of short-listed objects selected by a first user;
determining whether a reputation rank of second user in a user database is equal to or exceeds a reputation threshold, wherein the reputation rank of the second user is determined based on first historical selection information of product provided by the second user;

in the event that the reputation rank of the second user is equal to or exceeds the reputation threshold, regarding the second user as a reputed user;

in the event that the reputation rank of the second user fails to equal or exceed the reputation threshold, regarding the second user as a non-reputed user, determining historical selection information of the plurality of short-listed objects, the historical selection information including a historical count, a selection count, or both, the historical count corresponding to number of past times that each short-listed object was selected with a past target object information recommending request being sent to a server, and the selection count corresponding to number of times that each short-listed object was selected from past target object informational recommendation requests by reputed users as a target object, wherein the determining of the historical selection information of the plurality of short-listed objects comprises:

determining a second historical selection information of the plurality of short-listed objects provided by the non-reputed user; and removing the second historical selection information from the historical selection information of the plurality of short-listed objects to obtain updated historical selection information; and sending a portion of the historical selection information to a client, wherein the portion of the historical selection information corresponds to the updated historical selection information.

23. A computer program product for recommending target object information, the computer program product being embodied in a tangible non-transitory computer readable storage medium and comprising computer instructions for:

receiving information on a plurality of short-listed objects selected by a first user;

generating target object informational recommendation requests based on selected information, the target object informational recommendation requests including information pertaining to the plurality of short-listed objects selected by the first user;

sending the target object informational recommendation requests to a server so that the server is configured to:

determine whether a reputation rank of a second user in a user database is equal to or exceeds a reputation threshold, in the event that the reputation rank of the second user is equal to or exceeds the reputation threshold, regard the second user as a reputed user, in the event that the reputation rank of the second user fails to equal or exceed the reputation threshold, regard the second user as a non-reputed user, and determine historical selection information of the plurality of short-listed objects based on the target object recommendation requests, the historical selection information including a historical count, a selection count, or both, the historical count corresponding to number of past times that each short-listed object was selected with a past target object information recommending request being sent to the server, and the selection count corresponding to number of times that each short-listed object was selected from past target object informational recommendation requests by reputed users as a target object, wherein the determining of the historical selection information of the plurality of short-listed objects comprises to:

determine a second historical selection information of the plurality of short-listed objects provided by the non-reputed user; and remove the second historical selection information from the historical selection information of the plurality of short-listed objects to obtain updated historical selection information; and receiving a portion of the historical selection information, or support information sent by the server, the support information being support information that refers to the number of past times and a number of selections and is acquired for at least one short-listed object among the short-listed objects, wherein the portion of the historical selection information corresponds to the updated historical selection information.

\* \* \* \* \*